United States Patent [19]
Bashan

[11] 3,900,030
[45] Aug. 19, 1975

[54] CATAMENIAL TAMPONS

[75] Inventor: Robert N. Bashan, Lake Jackson, Tex.

[73] Assignee: The Dow Chemical Company, Midland, Mich.

[22] Filed: June 10, 1974

[21] Appl. No.: 477,564

[52] U.S. Cl. ............................ 128/285; 128/270
[51] Int. Cl. ................................... A61f 13/20
[58] Field of Search ........... 128/270, 285, 284, 287

[56] References Cited
UNITED STATES PATENTS

| | | | |
|---|---|---|---|
| 3,563,243 | 2/1971 | Lindquist | 128/287 |
| 3,628,534 | 12/1971 | Donohue | 128/285 |
| 3,669,103 | 6/1972 | Harper et al. | 128/284 X |
| 3,749,094 | 7/1973 | Duncan | 128/285 |
| 3,850,160 | 11/1974 | Denson | 128/2 B |

*Primary Examiner*—Aldrich F. Medbery
*Attorney, Agent, or Firm*—Richard W. Hummer

[57] ABSTRACT

Catamenial tampons prepared from a hydrophilic open-celled polymer foam, such as a hydrophilic polyurethane, containing controlled amounts of from about 15 to 30 percent by weight of finely divided, water-swellable polymer provide a high degree of sorbency combined with a desirable automatic cut-off of flow through the tampons.

4 Claims, No Drawings

CATAMENIAL TAMPONS

BACKGROUND OF THE INVENTION

My prior patent U.S. Pat. No. 3,669,103, with B. G. Harper and B. L. Atkins teaches the use of water-insoluble, water-swellable polymers to increase the capacity of sanitary articles such as bandages and catamenial devices for holding body fluids. Said patent disclosed that such sorbent polymers may be incorporated in supports such as polyurethane foams. Also, U.S. Pat. No. 3,563,243 teaches the use of foamed sheets of hydrophilic polymer in sanitary products such as diapers, underpads and the like. U.S. Pat. No. 3,628,534 teaches the use of a laminar structure comprising cellulosic fibers incorporating cross-linked polyacrylamides to produce a catamenial tampon having improved sorbency.

In spite of this activity in the field of sanitary products, there does not appear to have been a practical development of a tampon embodying a foamed absorbent. One problem in such applications is posed by the fact that when a hydrophilic, open-celled foam becomes filled with menstrual fluid it provides a wicking action whereby further fluid may leak through the device.

SUMMARY OF THE INVENTION

In accordance with the present invention it has been discovered that the incorporation of critical loadings of finely divided water-insoluble water-swellable polymers in hydrophilic polymer foams provides a medium for fabricating tampons having uniquely improved properties. Such improved tampons are fabricated from flexible, opencelled polyurethane foams having incorporated therein from about 15 to 30 percent by weight, preferably about 20 to 25 percent by weight, of a finely divided water-insoluble water-swellable polymer whereby flow through the tampon is cut off before leakage therethrough occurs.

It is among the advantages of the invention that, when operating within the defined limits, high sorptive capacity of the tampon is maintained while concurrently the swellable polymer acts to plug off flow through the tampon once optimal loading has occurred. With less than 15 percent by weight of the water-swellable polymer in the foam the desired plugging action is not achieved. Conversely when more than about 30 percent of water-swellable polymer is employed in the foam, plugging may occur before optimal loading is achieved and, in addition, the mechanical properties of the engorged foam are adversely affected so that the tampon may break apart during withdrawal.

For preparing the articles of the invention any of various hydrophilic, opencelled flexible polymer foams may be employed. Of such foams, polyurethane foams are preferred. Hydrophilic, flexible polyurethane foams can be prepared, for example, by reaction of a polyethylene glycol with a diisocyanate in the presence of suitable catalysts and conditioners as shown, for example, in U.S. Pat. No. 3,563,243. In general it is desirable that the polyol constituent employed in preparing such polyurethanes be composed of a major proportion of oxyethylene units to provide the desired hydrophilic properties. A preferred type of polyol starting material is provided by reacting glycerine with from about 5.5 to 6.5 moles of propylene oxide per mole of glycerine and thereafter reacting the resulting product with sufficient of a mixture containing 80 mole percent of ethylene oxide and 20 mole percent of propylene oxide to yield a polyol polymer having a molecular weight of from about 4,800 to 5,500. In any case the selected polyol is mixed with sufficient of a finely divided, water-insoluble, highly water-swellable polymer to provide from about 15 to 30 percent by weight of said polymer based on the finished weight of polyurethane foam and the polyol is then reacted with a diisocyanate employing conventional catalysts and conditioners to produce an opencelled foam. The proportions of catalyst and diisocyanate may be varied in predetermined fashion to produce a foam having sufficient wet strength for practical use in catamenial tampons. Alternatively the water-swellable polymer may be dispersed in the polyol and the polyurethane foam be continuously produced in sheet form employing the methods and apparatus of U.S. Pat. Nos. 3,686,047 and 3,804,931.

The hydrophilic foam containing the prescribed amount of water-swellable polymer may be either formed in films of the desired thickness or foamed in bulk and thereafter be cut to the desired thickness for fabrication into tampons. The flexibility and compressibility of the foams make it possible to fabricate the tampons in various configurations. In simplest form, the foam is merely cut into rectangular blocks of suitable dimensions, withdrawal strings are passed through the blocks near one end thereof and the blocks are compressed and inserted into lubricated tampon applicators of conventional form. Good results have been obtained when employing such blocks of foam having dimensions of 2 inches by 1.5 inches by 1 inch and passing a withdrawal string through the block about one-half inch from one end thereof. To provide more sorptive surface a grid of slits may be cut into the block from the end opposite the end carrying the withdrawal string. Such slits may, for example, be cut for about an inch into the block parallel to the longest axis thereof.

Alternatively the foam containing water-swellable polymer is cut in sheets 4 inches by 3 inches by one-fourth inch thick and rolled parallel to the long axis to produce a cylinder 4 inches long. A withdrawal string is secured around the midsection of the cylinder and the latter is folded over the string and compressed for insertion in a tampon applicator. Other alternatives such as securing a bundle of small elongated blocks (¼ inch × ¼ inch × 4 inches) with a withdrawal string at the middle of the long dimension will be apparent to those skilled in the fabrication of tampons.

In general it is desirable to coat the tampon-applicator interface with a lubricant to provide for ease of insertion of the tampon. Suitable lubricants are inert to the foam composition and nonirritating to human tissue. Pharmaceutical talc or polyglycerine have given good results as lubricants.

The water-insoluble, water-swellable polymers which are incorporated in the flexible hydrophilic foams in accordance with the present invention are lightly cross-linked polymers containing a plurality of hydrophilic groups such as carboxyl, carboxamide, sulfonate salt or hydroxyl groups, along the polymer chains in sufficient proportion that the polymer would be water-soluble if it were not for the crosslinking thereof. Representative water-swellable polymers include partially hydrolyzed polyacrylamide or a copolymer of acrylamide and acrylic acid crosslinked by the process of U.S. Pat. No.

3,247,171. Various other polymers may be employed such as polyvinylpyrrolidone and polymers and copolymers of acrylic acid, methacrylic acid, maleic anhydride, itaconic acid and the like, crosslinked to an extent corresponding to the amount of crosslinking introduced by copolymerizing a monoethylenically unsaturated monomer with from about 0.01 to about 1.5 mole percent of a divinyl compound such as methylenebisacrylamide, ethylene glycol dimethacrylate, the divinyl ether of diethylene glycol or the like. In general any of the waterswellable polymers disclosed in U.S. Pat. No. 3,669,103 may be employed. Another group of waterswellable polymers are prepared from watersoluble polymers containing a plurality of carboxyl groups by reaction with difunctional crosslinking agents such as diglycidyl ether or other diepoxides or epichlorohydrin as more fully discussed in the copending application of J. R. Gross, Ser. No. 371,909, filed June 20, 1973. Effective water swellable polymers for use in the present invention have a gel capacity of at least about 10, that is the polymer can imbibe and hold at least about 10 grams of aqueous fluid per gram of polymer.

In representative operations tampons were prepared in accordance with the present invention and tested for capacity and leakage in a testing device ("Syngyna") as recommended by Professor G. W. Rapp of Loyola University, Chicago, Illinois. In this device a cylindrical glass tube about 200 millimeters long has a diameter of about 30 millimeters (I.D.) for most of its length and is then constricted to a small diameter nipple. The tube has two side connections for introducing water to provide hydrostatic pressure and is lined with a strong, thin cylindrical rubber membrane connected to the open end and the constricted nipple end of the tube. In this device a tampon can be tested for its capacity for fluid while being subjected to uniform radial compressive force as would be the case in actual use. Blood or other fluid can be introduced from a reservoir into the space inside the membrane. The range of vaginal pressure in normal women is from about 135 to 185 millimeters of water. The following determinations were carried out with a hydrostatic pressure head of 150 millimeters of water applied to the membrane in the device.

The following examples illustrate the invention but are not to be construed as limiting.

EXAMPLE 1

A hydrophilic opencelled, polyurethane foam containing 17.6 percent by weight of water-swellable polymer was prepared as follows. 100 grams of a synthetic polyol was thoroughly mixed with 1 milliliter of DC 1310 (Dow-Corning silicone polyester fluid) and 30 grams of fine beads of a crosslinked copolymer of 70 percent acrylamide with 30 percent sodium acrylate. To the resulting mixture 3 grams of water, 0.15 milliliter of amine catalyst (Niax Al) and 0.3 gram of stannous octoate were added with thorough mixing and 36.2 grams of toluene diisocyanate (Hylene TM) was rapidly stirred in for 10 seconds. The mix was then poured into a half-gallon container and allowed to foam. The resulting polyurethane foam was cured in an oven at 120°C. for 10 minutes. The synthetic polyol employed as a starting material was prepared by reacting glycerine with sufficient propylene oxide to produce a prepolymer having an average molecular weight of about 450 and then reacting the prepolymer with sufficient of a mixture containing 80 mole percent of ethylene oxide and 20 mole percent of propylene oxide to yield a synthetic polyol having a molecular weight of about 5200. The crosslinked copolymer was prepared by suspending droplets of an aqueous solution containing 70 parts of acrylamide, 30 parts of sodium acrylate and about 0.5 part of N,N'-methylenebisacrylamide in an inert water-immiscible solvent and carrying out a peroxide catalyzed copolymerization of the acrylamide, acrylate and bisacrylamide compounds; the resulting polymer suspension was dewatered and the desired water-swellable polymer separated in the form of small bead-like particles having diameters of less than 10 microns.

The foam prepared above was sliced on a bandsaw into slabs of the desired thicknesses and tampons were fabricated by the various alternative methods set forth hereinabove by cutting the foam to shape, slitting, rolling or folding and attaching a withdrawal string. Each tampon was weighed and then compressed, lubricated and placed into an applicator tube. Each applicator was then inserted into the above described Syngyna device and subjected to a pressure of 150 millimeters of water. The tampon was ejected, the applicator tube removed and whole human blood was flowed into the tampon at a rate of 20 milliliters per hour through the opening at the constricted end of the tube in the device. The blood flowed into the tampon and was gelled by the water-swellable polymer in such manner that the swollen polymeric material plugged the tampon and prevented further blood from flowing therethrough. When each tampon was filled to capacity it was withdrawn from the device and weighed. Each design of tampon prepared from the above described batch of foam absorbed about 6.1 grams of blood per gram of tampon.

EXAMPLE 2

The procedure of Example 1 was repeated except that only 25 grams of the water-swellable polymer and 0.125 gram of stannous octoate were used in preparing the foam which thus contained 15.1 percent by weight of the water-swellable polymer. This foam was made into tampons and tested as in Example 1. In each case the blood flowed into the tampon and was gelled so that the swollen polymeric material plugged the tampon and prevented blood from flowing through the tampon. All of the tampon constructions gave absorptions of about 9.1 grams of blood per gram of tampon.

In contrast when Example 1 was again repeated except that only 20 grams of the water-swellable polymer and 0.125 gram of stannous octoate were used to produce a foam containing only 12.5 percent by weight of water-swellable polymer, it was found that tampons made from this latter foam allowed blood to flow through the tampon and to drip out of the apparatus. When four different brands of commercially available tampons were tested in the same fashion they were found to absorb 3.5, 4.4, 4.5 and 5.0 grams of blood per gram of tampon, respectively, and in each case the blood flowed through the tampon and dripped out of the apparatus.

Hydrophilic foams containing greater than 30 percent by weight of hydrophilic polymer are found to be inefficient since only a portion of the potential capacity of the foam can be realized because of excessive plugging in the area initially contacted by the fluid to be absorbed.

I claim:

1. In a catamenial tampon the improvement which comprises employing as the sorptive medium a flexible hydrophilic opencelled foam having uniformly dispersed therein from about 15 to about 30 percent by weight of a finely divided water-swellable polymer having a gel capacity of at least 10.

2. A tampon in accordance with claim 1 wherein the foam is comprised of a hydrophilic polyurethane.

3. A tampon in accordance with claim 2 wherein the water-swellable polymer is a lightly crosslinked polymer containing a plurality of carboxyl groups.

4. A tampon in accordance with claim 3 wherein the lightly crosslinked polymer is a hydrolyzed polyacrylamide or a copolymer of acrylamide and sodium acrylate.

* * * * *